US012695220B2

(12) United States Patent
Briant et al.

(10) Patent No.: US 12,695,220 B2
(45) Date of Patent: Jul. 28, 2026

(54) RECEPTACLE MODULE FOR A COMMUNICATION SYSTEM

(71) Applicant: TE Connectivity Solutions GmbH, Schaffhausen (CH)

(72) Inventors: Eric David Briant, Dillsburg, PA (US); Michael John Phillips, Camp Hill, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 423 days.

(21) Appl. No.: 18/343,983

(22) Filed: Jun. 29, 2023

(65) Prior Publication Data

US 2024/0039188 A1     Feb. 1, 2024

Related U.S. Application Data

(60) Provisional application No. 63/394,174, filed on Aug. 1, 2022.

(51) Int. Cl.
| | |
|---|---|
| *H01R 12/57* | (2011.01) |
| *G02B 6/42* | (2006.01) |
| *H01R 12/72* | (2011.01) |
| *H01R 13/633* | (2006.01) |
| *H01R 13/6582* | (2011.01) |

(52) U.S. Cl.
CPC ........... *H01R 12/57* (2013.01); *G02B 6/4261* (2013.01); *G02B 6/428* (2013.01); *H01R 12/72* (2013.01); *H01R 13/6335* (2013.01); *H01R 13/6582* (2013.01)

(58) Field of Classification Search
CPC .... H01R 12/57; H01R 12/72; H01R 13/6335; H01R 13/6582; H01R 12/716; H01R 12/585; H01R 13/6594; H01R 31/06; H01R 12/58; H01R 12/7052; H01R 12/71; H01R 13/2414; H01R 13/508; H01R 13/639; H01R 13/6581; G02B 6/4261; G02B 6/428
See application file for complete search history.

(56) References Cited

U.S. PATENT DOCUMENTS

| | | | | |
|---|---|---|---|---|
| 5,291,368 A * | 3/1994 | Conroy-Wass | ........ | H05K 7/183 |
| | | | | 361/730 |
| 6,736,671 B2 * | 5/2004 | Lee | ....................... | H01R 12/716 |
| | | | | 439/541.5 |
| 6,846,115 B1 * | 1/2005 | Shang | ................... | G02B 6/4277 |
| | | | | 439/91 |
| 7,857,662 B2 * | 12/2010 | Gillespie | .............. | H01R 13/658 |
| | | | | 439/607.2 |
| 8,282,415 B1 * | 10/2012 | Foltz | .................... | H01R 12/724 |
| | | | | 439/579 |

(Continued)

*Primary Examiner* — Truc T Nguyen

(57) ABSTRACT

A receptacle assembly includes a receptacle cage surrounding an intermediate connector configured to be coupled to the host circuit board. The receptacle cage receives a plug module and a receptacle module mated with the plug module. The receptacle module includes a receptacle housing having a card slot and holding a receptacle contact assembly. The receptacle contacts include cable contacts terminated to cables and intermediate contacts terminated to the intermediate connector. The intermediate connector electrically connects the intermediate contacts with the host circuit board.

18 Claims, 5 Drawing Sheets

(56) References Cited

U.S. PATENT DOCUMENTS

| | | | | |
|---|---|---|---|---|
| 8,613,632 B1* | 12/2013 | Nichols | H01R 13/6587 | 439/485 |
| 8,890,004 B2* | 11/2014 | Wickes | H05K 9/0009 | 174/382 |
| 10,923,843 B1* | 2/2021 | Henry | H01R 12/714 | |
| 11,626,694 B2* | 4/2023 | Long | H01R 13/6581 | 439/487 |
| 11,641,082 B2* | 5/2023 | Regnier | H01R 12/75 | 439/485 |
| 2003/0124881 A1* | 7/2003 | Avery | H01R 13/6471 | 439/246 |
| 2004/0203289 A1* | 10/2004 | Ice | G02B 6/4277 | 439/607.2 |
| 2005/0037655 A1* | 2/2005 | Henry | H05K 9/0058 | 439/341 |
| 2005/0136703 A1* | 6/2005 | Van Schuylenbergh | H05K 1/147 | 439/67 |
| 2009/0220227 A1* | 9/2009 | Wong | G02B 6/3878 | 398/41 |
| 2010/0304582 A1* | 12/2010 | Vittapalli | H01R 12/727 | 439/660 |
| 2014/0024244 A1* | 1/2014 | Fogg | H01R 13/6587 | 439/352 |
| 2014/0154912 A1* | 6/2014 | Hirschy | H05K 9/0058 | 439/487 |
| 2015/0146384 A1* | 5/2015 | Choi | H01R 43/00 | 439/78 |
| 2019/0109414 A1* | 4/2019 | Miller | H01R 24/20 | |
| 2020/0244025 A1* | 7/2020 | Winey | H01R 12/716 | |
| 2021/0050692 A1* | 2/2021 | Yang | H01R 13/6583 | |
| 2021/0307204 A1* | 9/2021 | Lu | H05K 7/20418 | |
| 2022/0200210 A1* | 6/2022 | Balakrishnan | H01R 13/659 | |
| 2023/0138913 A1* | 5/2023 | Morgan | H01R 12/75 | 439/65 |
| 2024/0039188 A1* | 2/2024 | Briant | G02B 6/4261 | |
| 2024/0297463 A1* | 9/2024 | Yang | H01R 12/721 | |
| 2025/0246850 A1* | 7/2025 | Rossman | H01R 13/6273 | |

* cited by examiner

RECEPTACLE MODULE FOR A COMMUNICATION SYSTEM

CROSS REFERENCE TO RELATED APPLICATIONS

This application claims benefit to U.S. Provisional Application No. 63/394,174, filed 1 Aug. 2022, titled "RECEPTACLE MODULE FOR A COMMUNICATION SYSTEM", the subject matter of which is herein incorporated by reference in its entirety.

BACKGROUND OF THE INVENTION

The subject matter herein relates generally to communication systems.

Some communication systems utilize transceivers or plug modules as I/O modules for data communication. The plug module is pluggably received in a receptacle cage of a receptacle assembly to interconnect the plug module with another component, such as a host circuit board through a communication connector mounted to the host circuit board. Due to the high speed of data transmission and the length of the traces on the host circuit board between the communication connector and other components mounted to the host circuit board, some known communication systems bypass data transmission on the host circuit board using a cable receptacle connector. The cable receptacle connector may be received in the rear end of the receptacle cage and the plug module is mated directly to the cable receptacle connector. Some known receptacle connectors include board contacts configured to directly connect to the host circuit board to communicate directly with the host circuit board. For example, the board contacts may be press fit into plated vias of the host circuit board. Removal of such board contacts requires disassembly of the entire system, such as removal of the shielding cage. Additionally, removal may damage the receptacle connector, such as the board contacts, or the host circuit board, such as the plated vias, such that the components are not reusable. It may be desirable to remove the cable receptacle connector to repair or replace the receptacle connector. Serviceable cable receptacle connectors are known that include a high speed cable and a low speed cable with corresponding high speed connector and low speed connector that may be mated to other components or the host circuit board at a location remote from the shielding cage. Such dual cable assemblies are expensive to manufacture and assemble.

A need remains for a communication system having a serviceable cable receptacle connector.

BRIEF DESCRIPTION OF THE INVENTION

In one embodiment, a receptacle assembly is provided and includes a receptacle cage having cage walls defining a module channel. The module channel extends between a front end and a rear end of the receptacle cage. The cage walls include a top cage wall and side cage walls extending from the top cage wall. The receptacle cage has a front cage interface at the front end configured to receive a plug module. The receptacle cage has a rear cage interface at the rear end. A bottom of the receptacle cage is configured to be mounted to a host circuit board. The receptacle assembly includes an intermediate connector received in the module channel at the bottom of the receptacle cage. The intermediate connector configured to be coupled to the host circuit board. The intermediate connector includes intermediate connector contacts configured to be electrically connected to the host circuit board. The receptacle assembly includes a receptacle module plugged into the rear end of the receptacle cage and coupled to the rear cage interface of the receptacle cage for mating with the plug module plugged into the front end of the receptacle cage. The receptacle module includes a receptacle housing having receptacle housing walls defining a receptacle module cavity. The receptacle housing has a card slot configured to receive a plug module circuit board of the plug module. The receptacle housing walls include a bottom wall facing the host circuit board. The receptacle module includes a receptacle contact assembly including receptacle contacts received in the receptacle module cavity of the receptacle housing. The receptacle contacts include cable contacts and intermediate contacts, each cable contact includes a cable contact mating end and a cable contact terminating end. The cable contact mating end arranged in the card slot to interface with the plug module circuit board, each intermediate contact includes an intermediate contact mating end and an intermediate contact terminating end. The intermediate contact mating end arranged in the card slot to interface with the plug module circuit board. The intermediate contact terminating end has a separable mating interface coupled to the corresponding intermediate connector contact of the intermediate connector. The receptacle module includes cables terminated to the cable contact terminating ends and extends from the receptacle housing. The intermediate connector electrically connects the intermediate contacts with the host circuit board.

In another embodiment, a receptacle module configured to be plugged into a receptacle cage of a receptacle assembly for mating with a plug module plugged into the receptacle cage is provided. The receptacle cage configured to be mounted to a host circuit board and cover an intermediate connector. The receptacle module includes a receptacle housing having receptacle housing walls defining a receptacle module cavity. The receptacle housing has a card slot configured to receive a plug module circuit board of the plug module. The receptacle housing walls include a bottom wall facing the host circuit board. The receptacle module includes a receptacle contact assembly includes receptacle contacts received in the receptacle module cavity of the receptacle housing. The receptacle contacts include cable contacts and intermediate contacts, each cable contact includes a cable contact mating end and a cable contact terminating end. The cable contact mating end arranged in the card slot to interface with the plug module circuit board, each intermediate contact includes an intermediate contact mating end and an intermediate contact terminating end. The intermediate contact mating end arranged in the card slot to interface with the plug module circuit board. The intermediate contact terminating end has a separable mating interface at the bottom wall configured to interface with the intermediate connector mounted to the host circuit board. The receptacle module includes cables terminated to the cable contact terminating ends and extends from the receptacle housing.

In a further embodiment, a communication system is provided and includes a receptacle cage having cage walls defining a module channel. The module channel extends between a front end and a rear end of the receptacle cage. The cage walls include a top cage wall and side cage walls extending from the top cage wall, a bottom of the receptacle cage is configured to be mounted to a host circuit board. The receptacle cage has a front cage interface at the front end. The receptacle cage has a rear cage interface at the rear end. The communication system includes an intermediate connector received in the module channel at the bottom of the receptacle cage. The intermediate connector configured to be coupled to the host circuit board. The intermediate connector includes intermediate connector contacts configured to be electrically connected to the host circuit board. The communication system includes a plug module plugged into the front end of the receptacle cage and coupled to the front cage interface. The plug module includes a plug housing has plug housing walls defining a plug module cavity. The plug module includes a plug module circuit board held by the plug housing in the plug module cavity. The plug module circuit board has a mating edge. The communication system includes a receptacle module plugged into the rear end of the receptacle cage and coupled to the rear cage interface for mating with the plug module plugged into the module channel of the receptacle cage. The receptacle module includes a receptacle housing having receptacle housing walls defining a receptacle module cavity. The receptacle housing has a card slot configured to receive a plug module circuit board of the plug module. The receptacle housing walls include a bottom wall facing the host circuit board. The receptacle module includes a receptacle contact assembly includes receptacle contacts received in the receptacle module cavity of the receptacle housing. The receptacle contacts include cable contacts and intermediate contacts, each cable contact includes a cable contact mating end and a cable contact terminating end. The cable contact mating end arranged in the card slot to interface with the plug module circuit board, each intermediate contact includes an intermediate contact mating end and an intermediate contact terminating end. The intermediate contact mating end arranged in the card slot to interface with the plug module circuit board. The intermediate contact terminating end has a separable mating interface coupled to the corresponding intermediate connector contact of the intermediate connector. The receptacle module includes cables terminated to the cable contact terminating ends and extends from the receptacle housing. The intermediate connector electrically connects the intermediate contacts with the host circuit board.

DETAILED DESCRIPTION OF THE INVENTION

Figures 1, 2:
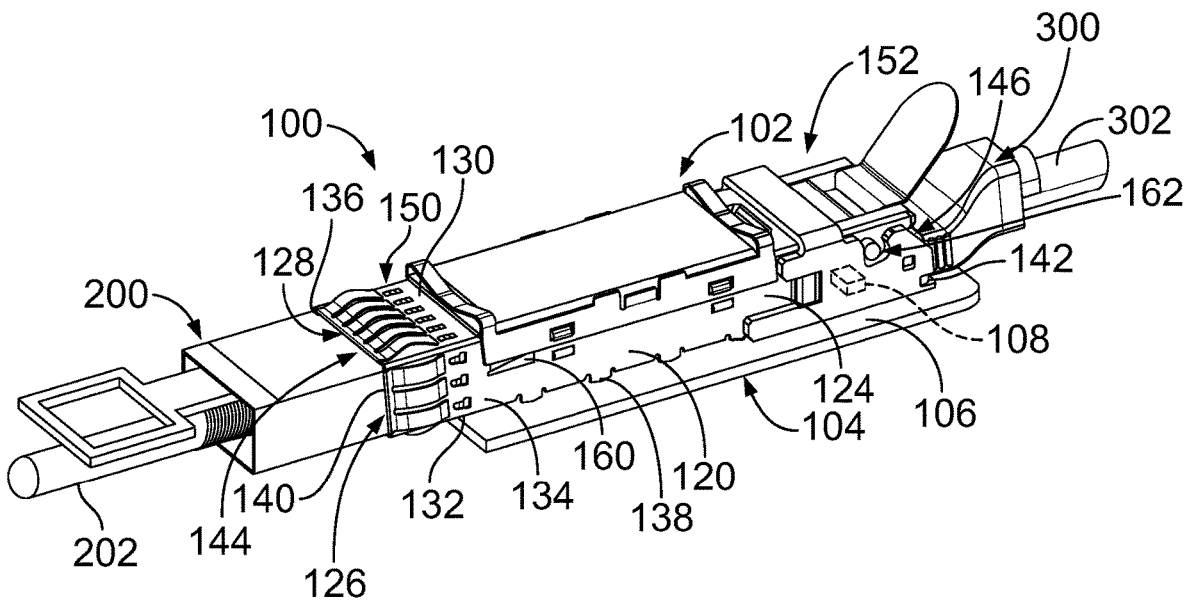
FIG. 1 is a top perspective view of a communication system formed in accordance with an exemplary embodiment.
FIG. 2 is a perspective view of the plug module in accordance with an exemplary embodiment.

FIG. 1 is a top perspective view of a communication system 100 formed in accordance with an exemplary embodiment. The communication system 100 includes a receptacle assembly 102 and one or more plug modules 200 configured to be electrically connected to the receptacle assembly 102. The receptacle assembly 102 includes one or more receptacle modules 300 configured to be electrically connected to corresponding plug modules 200. FIG. 1 illustrates a single receptacle module 300 and a single plug module 200; however, multiple receptacle modules 300 and corresponding plug modules 200 may be provided in alternative embodiments.

In an exemplary embodiment, the plug module 200 is electrically connected to one or more cables 202 and the receptacle module 300 is electrically connected to one or more cables 302. The plug module 200 is pluggably coupled to the corresponding receptacle module 300 at a separable mating interface. The plug module 200 and the receptacle module 300 are removable from the shielding cage of the receptacle assembly 102.

In an exemplary embodiment, the receptacle assembly 102 is mounted to a support structure 104. For example, in the illustrated embodiment, the support structure 104 may include a host circuit board 106. The receptacle assembly 102 is mounted to the host circuit board 106. In an exemplary embodiment, the receptacle module 300 is electrically connected to the host circuit board 106 via an intermediate connector 108 (shown in phantom) coupled to the host circuit board 106. The plug module 200 is electrically connected to the host circuit board 106 through the receptacle module 300 and the intermediate connector 108. Optionally, low speed signals may be transmitted through the intermediate connector 108. Power may additionally or alternatively be transmitted through the intermediate connector 108. The host circuit board 106 may provide a ground reference for the receptacle assembly 102. The plug module 200 is electrically connected to another component via the cable 302. Optionally, high speed signals may be transmitted through the cable 302.

In an exemplary embodiment, the support structure 104 may additionally, or alternatively, include a panel, such as a rack panel in a server. In other various embodiments, the panel may include a cabinet or chassis of an electrical device, such as a computer. The panel may be another type of support structure in alternative embodiments, such as a metal plate or sheet.

In an exemplary embodiment, the receptacle assembly 102 includes a receptacle cage 120. The intermediate connector 108 is located within the receptacle cage 120. The receptacle module 300 is configured to be loaded into a rear of the receptacle cage 120. The receptacle module 300 is configured to be mated to the intermediate connector 108 at a separable interface within the receptacle cage 120. The plug module 200 is configured to be loaded into a front of the receptacle cage 120. The plug module 200 is mated to the receptacle module 300 inside the receptacle cage 120. In various embodiments, the receptacle cage 120 is enclosed and provides electrical shielding for the intermediate connector 108, the receptacle module 300, and the plug module 200. In an exemplary embodiment, the receptacle module 300 is serviceable. For example, the receptacle module 300 is removable from the receptacle cage 120 for repair or replacement. The receptacle module 300 is configured to be separated from the intermediate connector 108 when the receptacle module 300 is removed from the receptacle cage 120.

The receptacle cage 120 includes a plurality of cage walls 124 that define a cavity 126. The cavity 126 may be subdivided by corresponding cage walls 124 to form one or more module channels 128 for receipt of corresponding plug modules 200 and receptacle modules 300. In the illustrated embodiment, the cavity 126 includes a single module channel 128; however, the receptacle cage 120 may include separating walls that divide the cavity 126 into two module channels 128. The module channels 128 may be stacked vertically and/or horizontally. The receptacle cage 120 includes front ports open at the front of the receptacle cage 120 to receive the plug modules 200 and rear ports open at the rear of the receptacle cage 120 to receive the receptacle modules 300. Any number of module channels 128 may be provided in various embodiments. For example, the receptacle cage 120 may include both ganged and stacked module channels 128 (for example, 2×2, 3×2, 4×2, 4×3, etc.). The cage walls 124 may be walls defined by solid sheets, perforated walls to allow airflow therethrough, or walls with cutouts, such as for a heat transfer device such as a heatsink, heat spreader, cold plate, and the like to pass therethrough. In the illustrated embodiment, the cage walls 124 are stamped and formed walls defining shielding walls.

In an exemplary embodiment, the cage walls 124 of the receptacle cage 120 include a top cage wall 130, a bottom cage wall 132, a first side cage wall 134, and a second side cage wall 136 for each module channel 128. Such cage walls 124 may be outer or exterior walls. The bottom cage wall 132 may rest on the support structure 104. In an exemplary embodiment, the cage walls 124 include cage mounting tabs 138 for mounting the receptacle cage 120 to the support structure 104, such as to the host circuit board 106. For example, the cage mounting tabs 138 may be compliant pins, such as press-fit pins, configured to be press-fit into vias in the host circuit board 106. Other types of cage mounting tabs 138 may be used in alternative embodiments.

The receptacle cage 120 extends between a front end 140 and a rear end 142. Front ports 144 are provided at the front end 140 providing access to the corresponding module channels 128 for the plug modules 200. Rear ports 146 are provided at the rear end 142 providing access to the corresponding module channels 128 for the receptacle modules 300. Some of the cage walls 124 may be interior cage walls that separate or divide the cavity 126 into the various module channels 128. For example, the cage walls 124 may include a divider separating the module channels 128 (for example, a horizontal divider or a vertical divider).

The walls 130, 132, 134, 136 form rectangular shaped module channels 128 in an exemplary embodiment extending along a longitudinal axis. The module channels 128 may extend the entire length between the front end 140 and the rear end 142. The receptacle cage 120 includes a front cage interface 150 at the front end 140 and a rear cage interface 152 at the rear end 142. The front cage interface 150 interfaces with the plug module 200. The rear cage interface 152 interfaces with the receptacle module 300. The front cage interface 150 is defined by an interior surface of the receptacle cage 120. The rear cage interface 152 is defined by an interior surface of the receptacle cage 120. In an exemplary embodiment, the front cage interface 150 is defined as the front quartile of the receptacle cage 120, including all features of the receptacle cage 120 interfacing with the plug module 200 and the rear cage interface 152 is defined as the rear quartile of the receptacle cage 120, including all features of the receptacle cage 120 interfacing with the receptacle module 300.

The front cage interface 150 is defined by the top cage wall 130, the bottom cage wall 132, the first side cage wall 134, and the second side cage wall 136 at the front end 140. For example, the front cage interface 150 may have a channel envelope (for example, size and shape) defined by the top cage wall 130, the bottom cage wall 132, the first side cage wall 134, and the second side cage wall 136 at the front end 140. The rear cage interface 152 is defined by the top cage wall 130, the bottom cage wall 132, the first side cage wall 134, and the second side cage wall 136 at the rear end 142. For example, the rear cage interface 152 may have a channel envelope (for example, size and shape) defined by the top cage wall 130, the bottom cage wall 132, the first side cage wall 134, and the second side cage wall 136 at the rear end 142. In an exemplary embodiment, the front cage interface 150 matches the rear cage interface 152. For example, the front cage interface 150 is identical to the rear cage interface 152. The front cage interface 150 may have the same size and the same shape as the rear cage interface 152. As such, either the plug module 200 or the receptacle module 300 may be plugged into and interface with the front cage interface 150 and such that either the plug module 200 or the receptacle module 300 may be plugged into and interface with the rear cage interface 152.

In an exemplary embodiment, the receptacle cage 120 includes front latching features 160 for each module channel 128 and rear latching features 162 for each module channel 128. The front latching features 160 are provided proximate to the front end 140. The rear latching features 162 are provided proximate to the rear end 142. The front latching features 160 form part of the front cage interface 150 configured to interface with the plug module 200. The rear latching features 162 form part of the rear cage interface 152 configured to interface with the receptacle module 300. The front latching features 160 are used to secure the plug module 200 in the module channel 128. The front latching features 160 are accessible and engaged by the plug module 200 from inside the module channel 128. The rear latching features 162 are used to secure the receptacle module 300 in the module channel 128. The rear latching features 162 are accessible and engaged by the receptacle module 300 from inside the module channel 128. The front latching features 160 may be identical to the rear latching feature 162. In various embodiments, the latching features 160, 162 are deflectable latching tabs. The latching tabs may be released to release the latching features 160, 162 from the modules 200, 300.

FIG. 2 is a perspective view of the plug module 200 in accordance with an exemplary embodiment. The plug module 200 includes a plug housing 210 defined by one or more shells, such as an upper shell 212 and a lower shell 214. In an exemplary embodiment, the plug housing 210 is manufactured from a conductive material, such as a metal material. The plug housing 210 provides electrical shielding for the plug module 200. The plug housing 210 may be thermally conductive. The plug housing 210 includes a mating end 216 and an opposite cable end 218. The cable 202 extends from the cable end 218. The mating end 216 is configured to be inserted into the corresponding module channel 128 (shown in FIG. 1). The cable end 218 is configured to extend from the front end 140 of the receptacle cage 120 (shown in FIG. 1) when the plug module 200 is plugged into the receptacle cage 120.

The plug housing 210 includes a top wall 220, a bottom wall 222, a first side wall 224 extending between the top wall 220 and the bottom wall 222, and a second side wall 226 extending between the top wall 220 and the bottom wall 222. The top wall 220 is part of the upper shell 212 and the bottom wall 222 is part of the lower shell 214. The first side wall 224 may be defined by the upper shell 212 and/or the lower shell 214. The second side wall 226 may be defined by the upper shell 212 and/or the lower shell 214. For example, in an exemplary embodiment, the upper and lower shells 212, 214 meet at an interface approximate centered along the side walls 224, 226. The plug housing 210 surrounds a plug module cavity 228. The plug module cavity 228 houses electrical components of the plug module 200. The cables 202 may extend into the plug module cavity 228 for termination to the electrical components.

In an exemplary embodiment, the plug module 200 includes a plug module circuit board 230 in the plug module cavity 228. The plug module circuit board 230 may be accessible at the mating end 216. The plug module circuit board 230 is configured to be communicatively coupled to the receptacle module 300 (shown in FIG. 1). For example, a mating edge 232 of the plug module circuit board 230 may be plugged into the receptacle module 300, such as in a card slot of the receptacle module 300. The plug module circuit board 230 includes electrical components used for operating and/or using the plug module 200. For example, the plug module circuit board 230 may have conductors, traces, pads, electronics, sensors, controllers, switches, inputs, outputs, and the like to form various circuits.

The plug module 200 includes a plug latch 240 for releasing the plug module 200 from the receptacle cage 120. The plug latch 240 includes plug latching features 242 at the first and second sides 224, 226 configured to secure the plug module 200 to the receptacle cage 120. For example, the plug latching features 242 are configured to interface with the front latching features 160 (shown in FIG. 1) of the receptacle cage 120. In an exemplary embodiment, the plug latching feature 242 includes a latching pocket 244. The deflectable latching feature 160 (shown in FIG. 1) is received in the latching pocket 244. In an exemplary embodiment, the plug housing 210 includes a latching shoulder 246 at the latching pocket 244. The deflectable latching tab 164 is received in the latching pocket 244 and engages the latching shoulder 246 to secure the plug module 200 in the receptacle cage 120.

In an exemplary embodiment, the plug latch 240 includes a plug release actuator 250 and latch arms 252 extending from the plug release actuator 250 along the first and second sides walls 224, 226. In an exemplary embodiment, the plug release actuator 250 includes a pull tab 254. The pull tab 254 is configured to be pulled to unlatch the deflectable latching tabs 164 to release the plug module 200 from the receptacle cage 120. For example, the pull tab 254 is pulled to move the plug latch 240 from an unactuated position to an actuated position. The latch arms 252 may slide horizontally relative to the plug housing 210 between the unactuated and actuated positions. The plug latch 240 may include a return spring (not shown) used to return the plug latch 240 to the unactuated position. The plug latch 240 includes plug release tabs 256 at distal ends of the latch arms 252. The plug release tabs 256 engage the deflectable latching tabs 164 when the plug latch 240 is moved from an unactuated position to an actuated position. The plug release tabs 256 press outward against the deflectable latching tabs 164 to release the deflectable latching tabs 164.

The plug housing 210 includes a plug mating interface 260 configured to interface with the front cage interface 150 (shown in FIG. 1) of the receptacle cage 120. The plug mating interface 260 is defined by an exterior surface of the plug housing 210. In an exemplary embodiment, the plug mating interface 260 is defined by the top wall 220, the bottom wall 222, the first side wall 224, and the second side wall 226, such as at the mating end 216. The plug mating interface 260 is defined by the plug latch 240, such as the latch arms 252 and the plug release tabs 256. The plug mating interface 260 may be defined along the entire length of the plug housing 210 that is received in the receptacle cage 120. For example, the plug mating interface 260 may extend a majority of the length of the plug housing 210.

Figure 3:
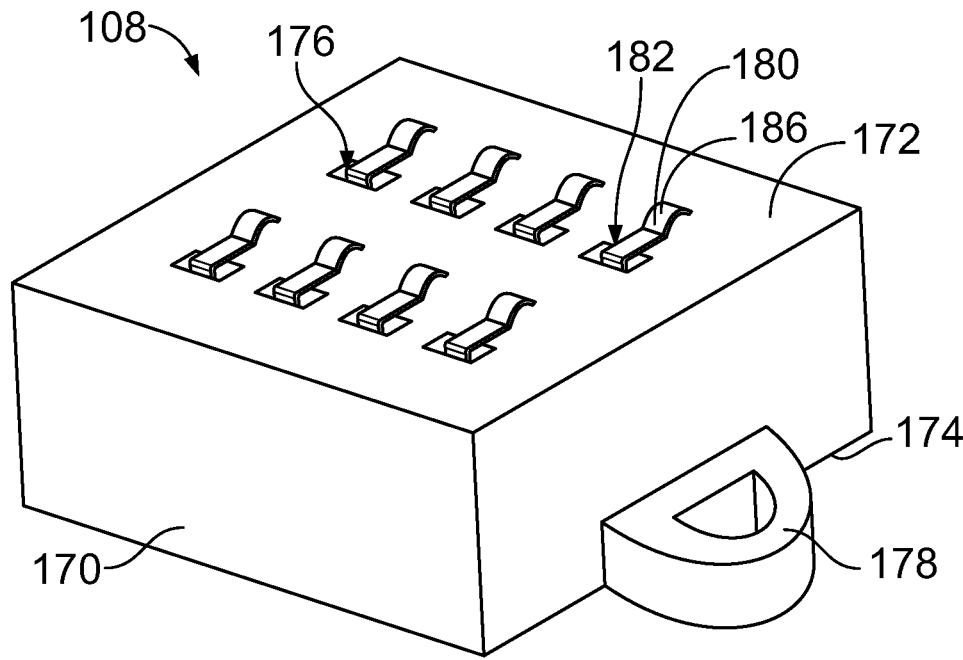
FIG. 3 is a top perspective view of the intermediate connector in accordance with an exemplary embodiment.
Figure 4:
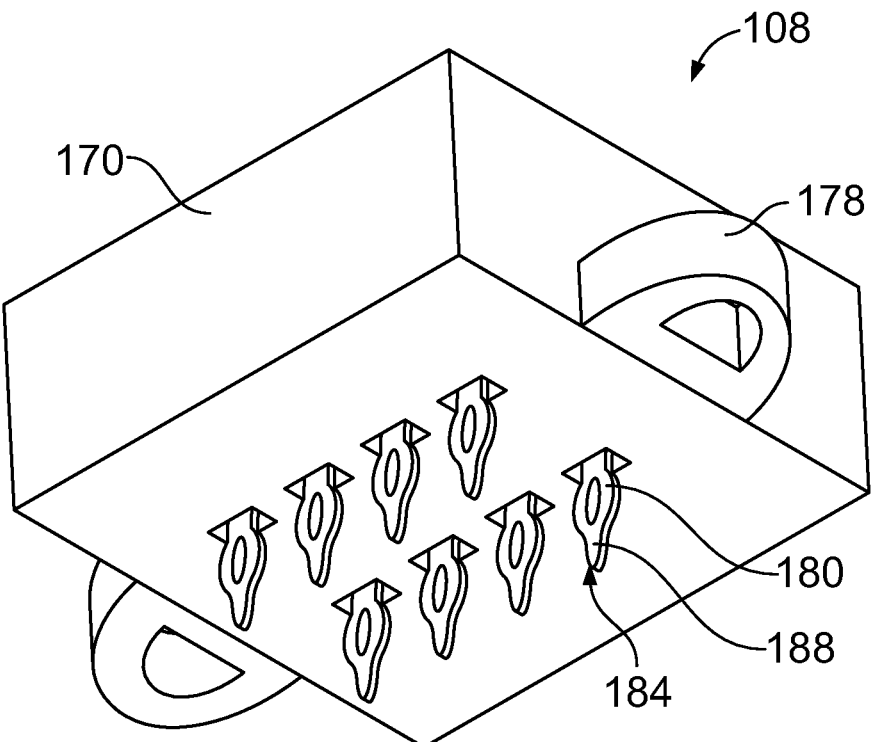
FIG. 4 is a bottom perspective view of the intermediate connector in accordance with an exemplary embodiment.

FIG. 3 is a top perspective view of the intermediate connector 108 in accordance with an exemplary embodiment. FIG. 4 is a bottom perspective view of the intermediate connector 108 in accordance with an exemplary embodiment.

The intermediate connector 108 includes an intermediate connector housing 170 and intermediate connector contacts 180 held by the intermediate connector housing 170. The intermediate connector housing 170 extends between an upper surface 172 and a lower surface 174. The upper surface 172 is configured to face the receptacle module 300. The lower surface 174 is configured to face the host circuit board 106. In an exemplary embodiment, the intermediate connector housing 170 includes contact channels 176 extending therethrough that receive corresponding intermediate connector contacts 180. In an exemplary embodiment, the intermediate connector housing 170 includes mounting features 178 configured to mount the intermediate connector 108 to the host circuit board 106 or the receptacle cage 120. For example, the mounting features 178 may be mounting tabs configured to be secured using fasteners or other securing means, such as latches, clips, and the like. In various embodiments, the mounting features 178 may be soldered or welded to the host circuit board 106 or the receptacle cage 120.

Each intermediate connector contact 180 includes an upper portion 182 and a lower portion 184. The upper portion 182 is provided at the upper surface 172 for mating with the receptacle module 300. The lower portion 184 is provided at the lower surface 174 for mating with the host circuit board 106. In the illustrated embodiment, the upper portion 182 includes a spring beam 186. The spring beam 186 is deflectable. The spring beam 186 includes a separable mating interface configured to be removably coupled to the receptacle module 300. The spring beam 186 may extend from the upper surface 172 and may be deflectable toward the upper surface 172 when mated to the receptacle module 300. The spring beam 186 may be spring biased against the receptacle module 300 to maintain mechanical and electrical connection with the receptacle module 300. Other types of mating portions may be provided at the upper portion 182 of the intermediate connector contacts 180 In alternative embodiments. In the illustrated embodiment, the lower portion 184 includes a compliant pin 188. The compliant pin 188 is configured to be press-fit into a plated via of the host circuit board 106 to mechanically and electrically connect the intermediate connector contacts 180 to the host circuit board 106. Other types of contacts may be provided at the lower portion 184, such as a spring beam or solder tail configured to be terminated to the host circuit board 106.

The intermediate connector contact 180 provides a direct electrical connection between the receptacle module 300 and the host circuit board 106, such as for low-speed signals and/or power or ground connections.

In various embodiments, the intermediate connector 108 is permanently coupled to the host circuit board 106, but provides a separable mating interface for the receptacle module 300. As such, the receptacle module 300 may be mated to and unmated from the intermediate connector 108, such as for repair or replacement of the receptacle module 300. In the illustrated embodiment, the intermediate connector contacts 180 are arranged in multiple rows, such as two rows. However the intermediate connector contacts 180 may have other arrangements in alternative embodiments.

Figure 5:
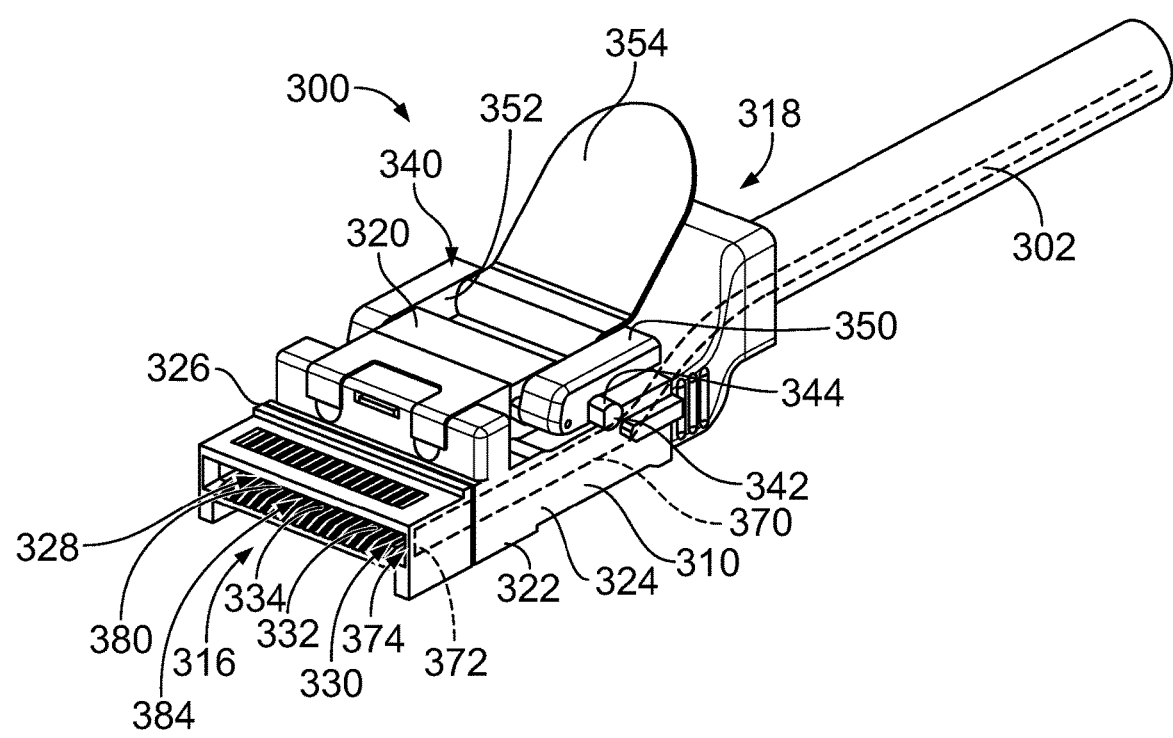
FIG. 5 is a top perspective view of the receptacle module in accordance with an exemplary embodiment.
Figure 6:
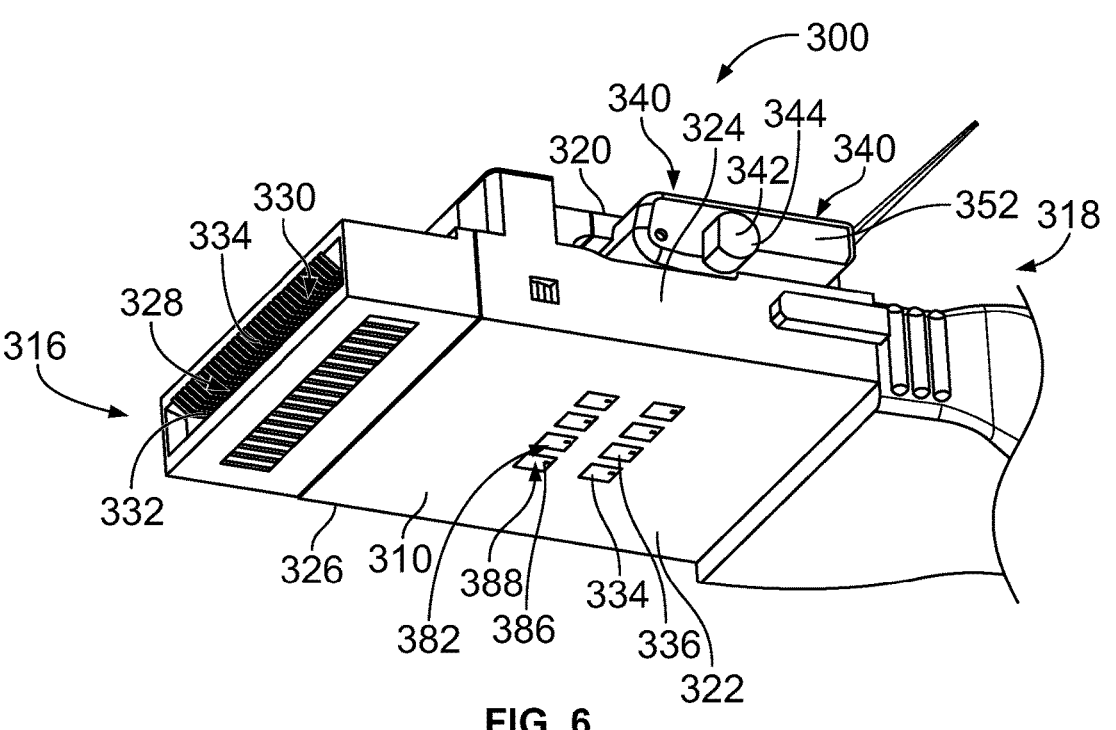
FIG. 6 is a bottom perspective view of the receptacle module in accordance with an exemplary embodiment.

FIG. 5 is a top perspective view of the receptacle module 300 in accordance with an exemplary embodiment. FIG. 6 is a bottom perspective view of the receptacle module 300 in accordance with an exemplary embodiment.

The receptacle module 300 includes a receptacle housing 310 defined by one or more shells, such as an upper shell and a lower shell. Optionally, the receptacle housing 310 may be at least partially manufactured from a conductive material, such as a metal material to provide electrical shielding for the receptacle module 300. The receptacle housing 310 includes a mating end 316 and an opposite cable end 318. The cable 302 extends from the cable end 318. The mating end 316 is configured to be inserted into the corresponding module channel 128 (shown in FIG. 1). The cable end 318 is configured to extend from the rear end 142 of the receptacle cage 120 (shown in FIG. 1) when the receptacle module 300 is plugged into the receptacle cage 120.

The receptacle housing 310 includes a top wall 320, a bottom wall 322, a first side wall 324 extending between the top wall 320 and the bottom wall 322, and a second side wall 326 extending between the top wall 320 and the bottom wall 322. In an exemplary embodiment, the receptacle housing 310 includes a card slot 328 at the mating end 316. The card slot 328 is configured to receive the plug module circuit board 230 (shown in FIG. 4). The receptacle housing 310 extends above and below the card slot 328.

In an exemplary embodiment, the receptacle module 300 includes a receptacle contact assembly 330 received in the receptacle housing 310. The receptacle contact assembly 330 includes cable contacts 332 and intermediate contacts 334. Conductors of the cables 302 may be terminated to the cable contacts 332, such as being soldered to the cable contacts 332. The intermediate contacts 334 are configured to be coupled to the intermediate conductor contacts 180 of the intermediate connector 108. In an exemplary embodiment, the intermediate contacts 334 have separable mating interfaces 336 configured to be removably coupled to the intermediate connector contacts 180. The cable contacts 332 and the intermediate contacts 334 extend to the card slot 328 for mating with the plug module circuit board 230. In an exemplary embodiment, the cable contacts 332 and the intermediate contacts 334 are both arranged in an upper row and in a lower row on opposite sides of the card slot 328 to interface with both sides of the plug module circuit board 230. In the illustrated embodiment, the intermediate contacts 334 are located at the center of the receptacle module 300 and the cable contacts 332 are arranged at the outer sides of the receptacle module 300 (for example, flanking both sides of the intermediate contacts 334). However, other arrangements are possible in alternative embodiments.

In an exemplary embodiment, each cable contact 332 is a stamped and formed contact. The cable contact 332 extends between a cable contact mating end 370 and a cable contact terminating end 372 (shown in phantom). The cable contact terminating end 372 is terminated to the conductor of the corresponding cable 302. For example, the cable contact terminating end 372 may include a pad welded or soldered to the conductor of the cable 302. In other various embodiments, the cable contact terminating end 372 may include a crimp barrel configured to be crimped to the end of the cable 302. The cable contact mating end 370 includes a spring beam 374 that extends into the card slot 328. The spring beam 374 is deflectable and may be deflected outward when the plug module circuit board 230 is plugged into the card slot 328. The spring beam 374 presses against the plug module circuit board 230 to maintain mechanical and electrical connection with the plug module circuit board 230. The spring beam 374 defines a separable mating interface with the plug module circuit board 230 to allow mating and a mating of the plug module 200 with the receptacle module 300.

In an exemplary embodiment, each intermediate contact 334 is a stamped and formed contact. The intermediate contact 334 extends between an intermediate contact mating end 380 and an intermediate contact terminating end 382 (FIG. 6). The intermediate contact mating end 380 includes a spring beam 384 that extends into the card slot 328. The spring beam 384 is deflectable and may be deflected outward when the plug module circuit board 230 is plugged into the card slot 328. The spring beam 384 presses against the plug module circuit board 230 to maintain mechanical and electrical connection with the plug module circuit board 230. The spring beam 384 defines a separable mating interface with the plug module circuit board 230 to allow mating and a mating of the plug module 200 with the receptacle module 300. Optionally, the spring beam 384 may be identical to the spring beam 374. For example, the spring beam 384 may be sized and shaped the same as the spring beam 374. In an exemplary embodiment, the spring beams 374, 384 are interspersed within the card slot 328, such as in two rows (an upper row and a lower row), for mating with the plug module circuit board 230. In various embodiments, the intermediate contacts 334 are arranged in the central region of the card slot 328 and the cable contacts 332 are arranged at the right and left sides of the card slot 328. Other arrangements are possible in alternative embodiments.

The intermediate contact terminating end 382 is configured to be electrically connected to the corresponding intermediate connector contact 180. In an exemplary embodiment, the intermediate contact terminating end 382 includes a pad 386 configured to interface with the spring beam 186 of the corresponding intermediate connector contact 180. The intermediate contact terminating end 382 has a separable mating interface 388. The intermediate contact terminating end 382 is removably coupled to the spring beam 186 at the separable mating interface 388. For example, the intermediate contact terminating end 382 is slidably coupled to the spring beam 186 at the separable mating interface 388 to allow mating to and unmated from the spring beam 186. Other types of contact interfaces may be provided at the intermediate contact terminating end 382 other than the pad 386. For example, the intermediate contact terminating end 382 may include a spring beam, a pin, a socket, or another type of contact interface in alternative embodiments. Optionally, the pad 386 may be provided at an end of the spring beam such that the pad 386 is deflectable relative to the receptacle housing 310 during mating with the intermediate connector contact 180.

In an exemplary embodiment, the intermediate contact terminating ends 382 are contained within the receptacle housing footprint of the receptacle housing 310 (for example, between the sides and between the front and rear of the receptacle housing 310). In an exemplary embodiment, the intermediate contact terminating ends 382 are exposed at an exterior of the receptacle housing 310 for mating with the intermediate connector contact 180. For example, the intermediate contact terminating ends 382 are provided at the bottom wall 322. In various embodiments, the intermediate contact terminating ends 382 may extend outward from the bottom wall 322. In other various embodiments, the intermediate contact terminating ends 382 may be recessed within the bottom wall 322. The intermediate contact terminating end 382 may be located at other locations of the receptacle housing 310 in alternative embodiments.

The receptacle module 300 includes a receptacle latch 340 for releasing the receptacle module 300 from the receptacle cage 120. The receptacle latch 340 includes receptacle latching features 342 at the first and second sides 324, 326 configured to secure the receptacle module 300 to the receptacle cage 120. For example, the receptacle latching features 342 are configured to interface with the rear latching features 162 (shown in FIG. 1) of the receptacle cage 120. In an exemplary embodiment, the receptacle latching feature 342 includes a latching post 344 configured to be received in the pocket of the rear latching feature 162.

In an exemplary embodiment, the receptacle latch 340 includes a receptacle release actuator 350 and latch arms 352 extending from the receptacle release actuator 350 along the first and second sides walls 324, 326. The latching posts 344 extend from the latch arms 352. In an exemplary embodiment, the receptacle release actuator 350 includes a pull tab 354. The pull tab 354 is configured to be pulled to unlatch the deflectable latching tabs 166 to release the receptacle module 300 from the receptacle cage 120. For example, the pull tab 354 is pulled to move the receptacle latch 340 from an unactuated position to an actuated position. The latch arms 352 may slide horizontally relative to the receptacle housing 310 between the unactuated and actuated positions.

The receptacle housing 310 includes a receptacle mating interface 360 configured to interface with the front cage interface 150 (shown in FIG. 1) of the receptacle cage 120. The receptacle mating interface 360 is defined by an exterior surface of the receptacle housing 310. In an exemplary embodiment, the receptacle mating interface 360 is defined by the top wall 320, the bottom wall 322, the first side wall 324, and the second side wall 326, such as at the mating end 316. The receptacle mating interface 360 is defined by the receptacle latch 340, such as the latch arms 352 and the latching posts 344. The receptacle mating interface 360 may be defined along the entire length of the receptacle housing 310 that is received in the receptacle cage 120. For example, the receptacle mating interface 360 may extend a majority of the length of the receptacle housing 310.

With additional reference back to FIG. 2, in an exemplary embodiment, the receptacle mating interface 360 (for interfacing with the receptacle cage 120) matches the plug mating interface 260 (for interfacing with the receptacle cage 120). For example, the receptacle mating interface 360 may have generally the same size and shape (width and height) as the plug mating interface 260. For example, the plug housing 210 and the receptacle housing 310 may have generally the same exterior perimeter dimensions. Other portions of the plug housing 210 and the receptacle housing 310 may have different dimensions, such as the ends of the plug module 200 and the receptacle module 300 that are located exterior of the receptacle cage 120.

Figure 7:
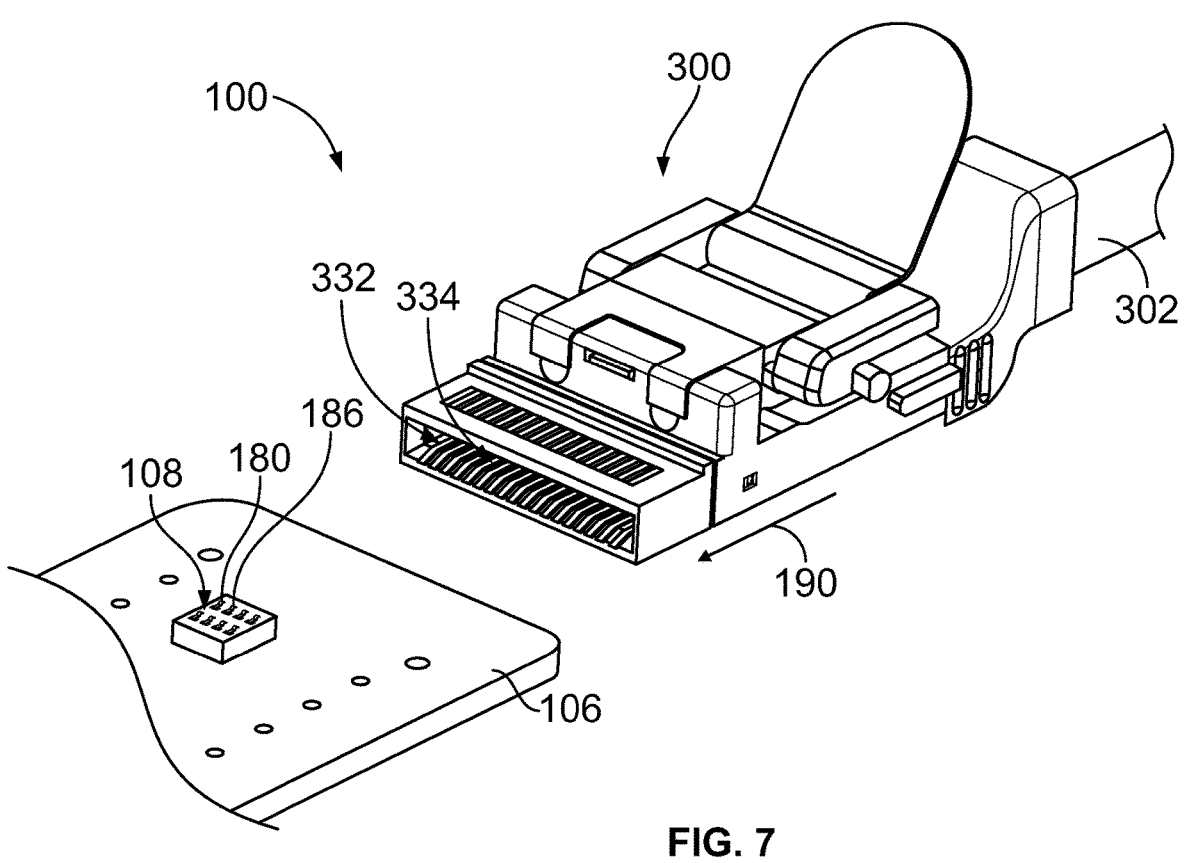
FIG. 7 is a perspective view of a portion of the communication system showing the receptacle module poised for coupling with the intermediate connector, which is mounted to the host circuit board in accordance with an exemplary embodiment.
Figure 8:
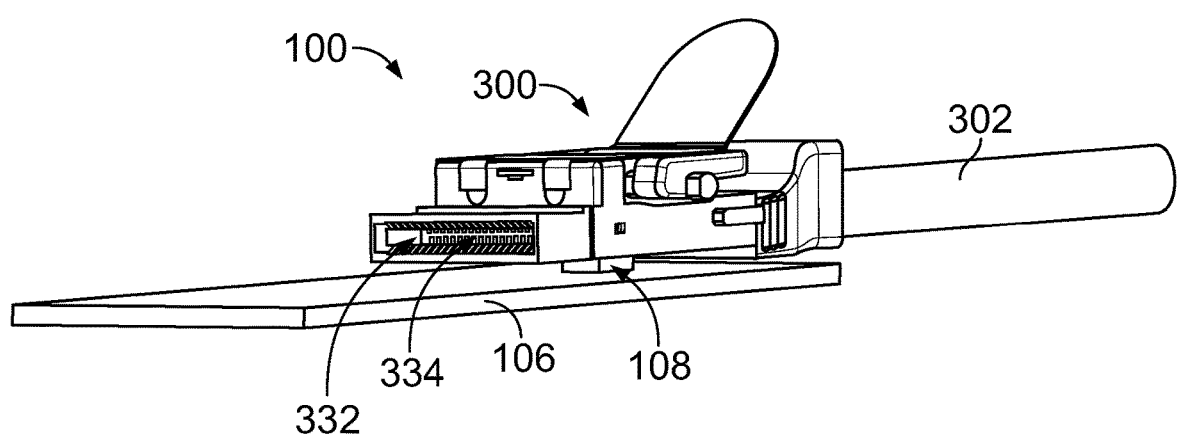
FIG. 8 is a perspective view of a portion of the communication system showing the receptacle module coupled to the intermediate connector, which is mounted to the host circuit board in accordance with an exemplary embodiment.

FIG. 7 is a perspective view of a portion of the communication system 100 showing the receptacle module 300 poised for coupling with the intermediate connector 108, which is mounted to the host circuit board 106. FIG. 8 is a perspective view of a portion of the communication system 100 showing the receptacle module 300 coupled to the intermediate connector 108, which is mounted to the host circuit board 106. The receptacle cage 120 (FIG. 1) is removed in FIGS. 7 and 8 to illustrate the receptacle module 300 and the intermediate connector 108.

During mating, the receptacle module 300 is mated to the intermediate connector 108 in a mating direction 190. In various embodiments, the mating direction 190 is generally parallel to the upper surface of the host circuit board 106. The intermediate connector contacts 180 define a separable mating interface with the receptacle module 300 to allow mating to and unmated from the intermediate connector 108. In an exemplary embodiment, the intermediate contacts 334 are slidably coupled to the intermediate connector contacts 180 at the separable mating interface. The spring beams 186 may be deflected and compressed during mating to create a reliable mechanical and electrical connection between the intermediate connector contacts 180 and the intermediate contact 334.

The intermediate connector 108 creates a direct electrical path between the intermediate contact 334 of the receptacle module 300 and the host circuit board 106. In an exemplary embodiment, the low speed signals are transmitted through the intermediate connector 108 and the intermediate contact 334. However, ground and/or power connections may be provided by the intermediate connector contacts 180 to supply a ground reference and/or power to the receptacle module 300. In an exemplary embodiment, the high speed signals of the receptacle module 300 are transmitted through the cable contacts 332 and the cables 302. The intermediate connector 108 may eliminate the need to transmit the low speed signals through the cables 302, which may reduce the manufacturing and/or assembly complexity and cost of the receptacle module 300.

Figure 9:
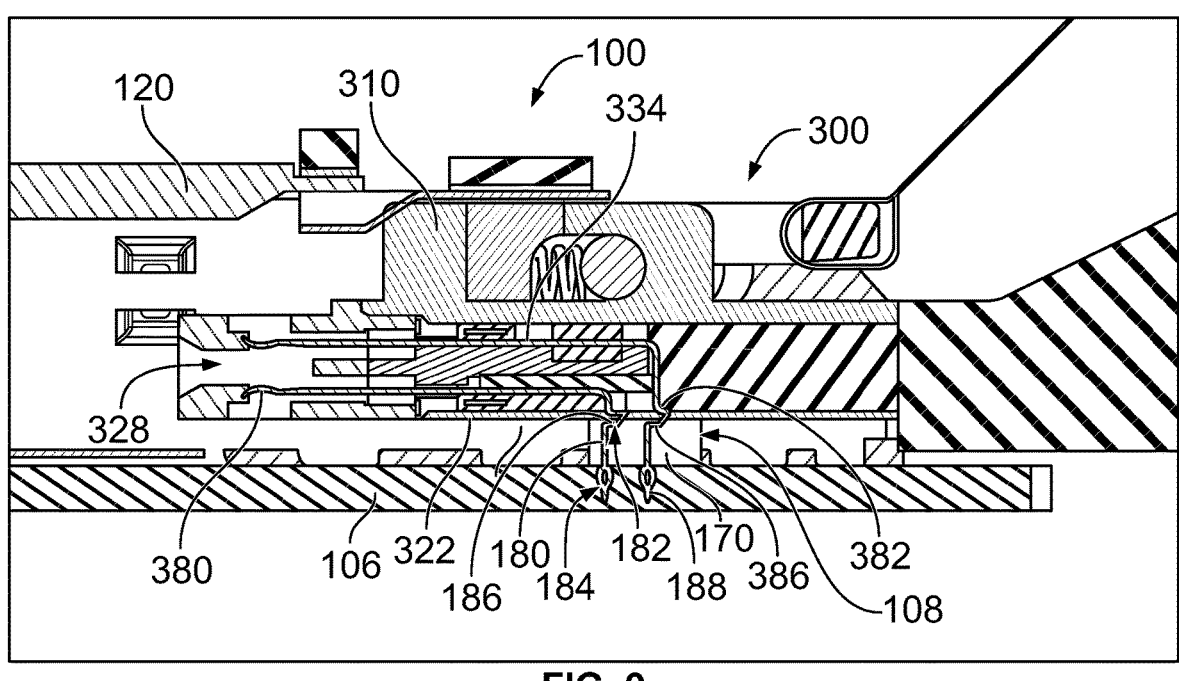
FIG. 9 is a cross-sectional view of the components of the communication system in accordance with an exemplary embodiment.

FIG. 9 is a cross-sectional view of the components of the communication system 100 in accordance with an exemplary embodiment. FIG. 9 illustrates the receptacle module 300 mated with the intermediate connector 108. The intermediate connector 108 is mounted to the host circuit board 106. The intermediate connector contacts 180 are electrically connected to the host circuit board 106. For example, the lower portions 184 of the intermediate connector contacts 180 are electrically connected to the host circuit board 106. In the illustrated embodiment, the compliant pins 188 are press-fit into the host circuit board 106. The intermediate connector contacts 180 extend through the intermediate connector housing 170 to the upper surface 172. The spring beams 186 at the upper portions 182 of the intermediate connector contacts 180 interface with the receptacle module 300 to create a direct electrical path between the receptacle module 300 and the host circuit board 106.

The intermediate contacts 334 extend through the receptacle housing 310 from the card slot 328 at the front of the receptacle housing 310 to the bottom wall 322 of the receptacle housing 310. The intermediate contact mating ends 380 are arranged in the card slot 328 to interface with the plug module circuit board 230. The intermediate contact terminating ends 382 are provided at the bottom wall 322 to interface with the intermediate connector contacts 180. In the illustrated embodiment, the spring beams 186 of the intermediate connector contacts 180 are spring loaded against the pads 386 at the intermediate contact terminating ends 382 to maintain mechanical and electrical connection between the intermediate connector contacts 180 and the intermediate contacts 334. The intermediate contacts 334 are mated to the intermediate connector contacts 180 at separable mating interfaces to allow removal of the receptacle module 300 from the receptacle cage 120. As such, the receptacle module 300 is serviceable to allow repair or replacement of the receptacle module 300. The intermediate connector 108 provides a separable interface between the receptacle module 300 and the host circuit board 106. For example, the receptacle module 300 may be unmated from the intermediate connector 108, which remains permanently mated to the host circuit board 106.

Figure 10:
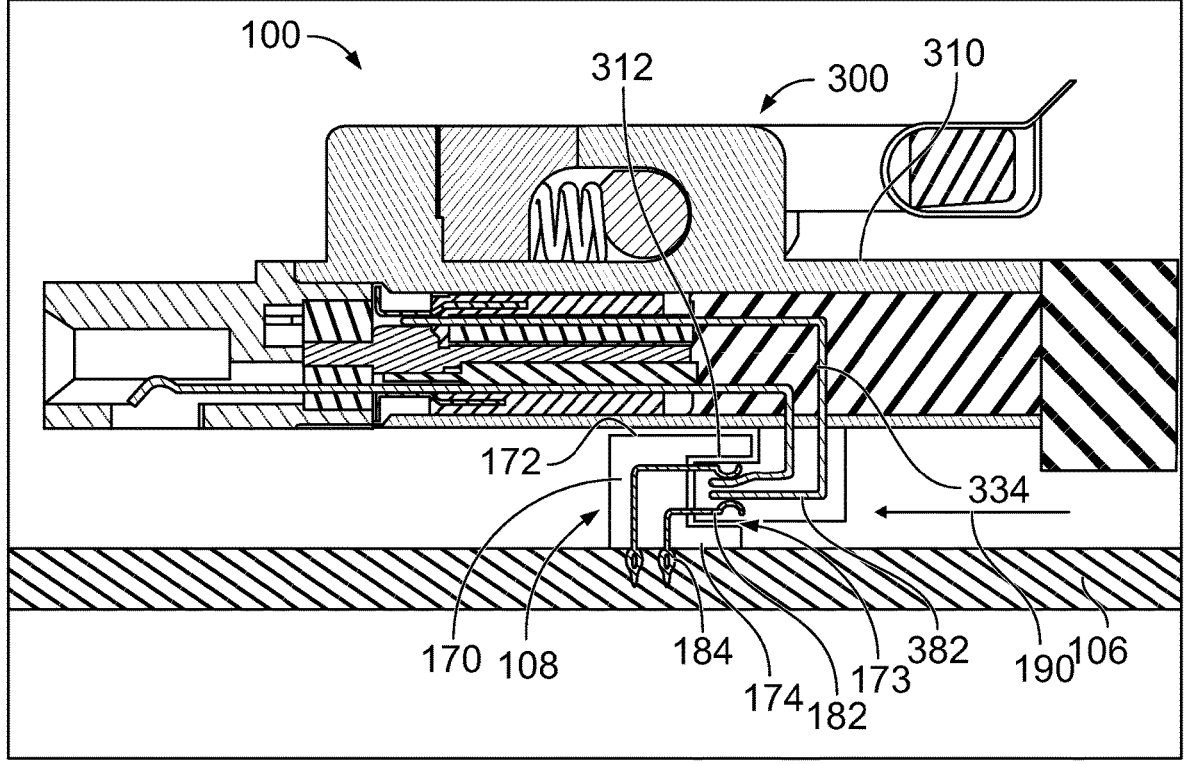
FIG. 10 is a cross-sectional view of the components of the communication system in accordance with an exemplary embodiment.

FIG. 10 is a cross-sectional view of the components of the communication system 100 in accordance with an exemplary embodiment. FIG. 10 illustrates the receptacle module 300 mated with the intermediate connector 108. In the illustrated embodiment, the intermediate connector 108 is a right angle connector having the upper portions 182 of the intermediate connector contacts 180 oriented perpendicular to the lower portions 184 of the intermediate connector contacts 180. In the illustrated embodiment, the intermediate connector housing 170 includes a slot 173 along one of the sides between the upper surface 172 and the lower surface 174. The slot 173 receives a portion of the receptacle module 300. The slot 173 receives the intermediate contact terminating ends 382 of the intermediate contacts 334. In an exemplary embodiment, the upper portions 182 are provided both above and below the slot 173 to interface with the intermediate contact terminating ends 382. The intermediate connector contacts 180 create a direct electrical path between the intermediate contacts 334 and the host circuit board 106.

In the illustrated embodiment, the receptacle housing 310 includes a contact support 312 at the bottom of the receptacle housing 310. The contact support supports the intermediate contact terminating ends 382 of the intermediate contacts 334. In an exemplary embodiment, the contact support 312 is plugged into the slot 173. The intermediate contact terminating ends 382 may extend along an upper surface and a lower surface of the contact support 312 to interface with the upper portions 182 of the intermediate connector contacts 180. The contact support 312 and the intermediate contact terminating ends 382 are configured to be plugged into the slot 173 in the mating direction 190. The contact support 312 and the intermediate contact terminating ends 382 may be unplugged from the slot 173 when the receptacle module 300 is removed from the receptacle cage 120. As such, the receptacle module 300 is serviceable to allow repair or replacement of the receptacle module 300. The intermediate connector 108 provides a separable interface between the receptacle module 300 and the host circuit board 106. For example, the receptacle module 300 may be unmated from the intermediate connector 108, which remains permanently mated to the host circuit board 106.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A receptacle assembly comprising:

a receptacle cage having cage walls defining a module channel, the module channel extending between a front end and a rear end of the receptacle cage, the cage walls including a top cage wall and side cage walls extending from the top cage wall, the receptacle cage having a front cage interface at the front end configured to receive a plug module, the receptacle cage having a rear cage interface at the rear end, wherein a bottom of the receptacle cage is configured to be mounted to a host circuit board;

an intermediate connector received in the module channel at the bottom of the receptacle cage, the intermediate connector including an intermediate connector housing holding intermediate connector contacts, the intermediate connector housing configured to be coupled to the host circuit board, the intermediate connector contacts configured to be electrically connected to the host circuit board; and a receptacle module plugged into the rear end of the receptacle cage and coupled to the rear cage interface of the receptacle cage for mating with the plug module plugged into the front end of the receptacle cage, the receptacle module comprising:

a receptacle housing having receptacle housing walls defining a receptacle module cavity, the receptacle housing having a card slot configured to receive a plug module circuit board of the plug module, the receptacle housing walls including a bottom wall facing the host circuit board;

a receptacle contact assembly including receptacle contacts received in the receptacle module cavity of the receptacle housing, the receptacle contacts including cable contacts and intermediate contacts, each cable contact including a cable contact mating end and a cable contact terminating end, the cable contact mating end arranged in the card slot to interface with the plug module circuit board, each intermediate contact including an intermediate contact mating end and an intermediate contact terminating end, the intermediate contact mating end arranged in the card slot to interface with the plug module circuit board, the intermediate contact terminating end having a separable mating interface coupled to the corresponding intermediate connector contact of the intermediate connector; and cables terminated to the cable contact terminating ends and extending from the receptacle housing;

wherein the intermediate connector electrically connects the intermediate contacts with the host circuit board.

2. The receptacle assembly of claim 1, wherein the receptacle module is removable from the receptacle cage, the intermediate contacts being separated from the intermediate connector contacts when the receptacle module is removed from the receptacle cage.

3. The receptacle assembly of claim 1, wherein the intermediate contact terminating ends are provided at the bottom wall for mating with the intermediate connector contacts.

4. The receptacle assembly of claim 1, wherein the intermediate contact terminating ends are exposed at an exterior of the receptacle housing for mating with the intermediate connector contacts.

5. The receptacle assembly of claim 1, wherein the intermediate connector contacts directly connect the intermediate contacts to the host circuit board.

6. The receptacle assembly of claim 1, wherein the intermediate connector is coupled to the receptacle cage, the intermediate connector being coupled to the host circuit board within the receptacle cage.

7. The receptacle assembly of claim 1, wherein the intermediate connector contacts include spring beams at a bottom of the intermediate connector, the spring beams being compressible against board contacts of the host circuit board.

8. The receptacle assembly of claim 1, wherein the intermediate connector contacts include compliant pins at a bottom of the intermediate connector, the compliant pins being press-fit into vias of the host circuit board.

9. The receptacle assembly of claim 1, wherein the intermediate contact terminating ends are slidably coupled to the intermediate connector contacts when the receptacle module is plugged into the receptacle cage.

10. The receptacle assembly of claim 1, wherein the receptacle cage has a cage footprint above the host circuit board, the intermediate connector being coupled to the host circuit board within the cage footprint.

11. The receptacle assembly of claim 1, wherein the intermediate connector is located between the receptacle module and the host circuit board.

12. A receptacle module configured to be plugged into a receptacle cage of a receptacle assembly for mating with a plug module plugged into the receptacle cage, the receptacle cage configured to be mounted to a host circuit board and cover an intermediate connector, the receptacle module comprising:

a receptacle housing having receptacle housing walls defining a receptacle module cavity, the receptacle housing having a card slot configured to receive a plug module circuit board of the plug module, the receptacle housing walls including a bottom wall facing the host circuit board;

a receptacle contact assembly including receptacle contacts received in the receptacle module cavity of the receptacle housing, the receptacle contacts including cable contacts and intermediate contacts, each cable contact including a cable contact mating end and a cable contact terminating end, the cable contact mating end arranged in the card slot to interface with the plug module circuit board, each intermediate contact including an intermediate contact mating end and an intermediate contact terminating end, the intermediate contact mating end arranged in the card slot to interface with the plug module circuit board, the intermediate contact terminating end having a contact pad flush with the bottom wall of the receptacle housing defining a separable mating interface at the bottom wall configured to interface with the intermediate connector mounted to the host circuit board; and cables terminated to the cable contact terminating ends and extending from the receptacle housing.

13. The receptacle module of claim 12, wherein the receptacle module is removable from the receptacle cage, the intermediate contacts configured to be separated from the intermediate connector contacts when the receptacle module is removed from the receptacle cage.

14. The receptacle module of claim 12, wherein the intermediate contact terminating ends are slidably coupled to the intermediate connector contacts when the receptacle module is plugged into the receptacle cage.

15. A communication system comprising:

a receptacle cage having cage walls defining a module channel, the module channel extending between a front end and a rear end of the receptacle cage, the cage walls including a top cage wall and side cage walls extending from the top cage wall, a bottom of the receptacle cage is configured to be mounted to a host circuit board, the receptacle cage having a front cage interface at the front end, the receptacle cage having a rear cage interface at the rear end;

an intermediate connector received in the module channel at the bottom of the receptacle cage, the intermediate connector including an intermediate connector housing holding intermediate connector contacts, the intermediate connector housing configured to be coupled to the host circuit board, the intermediate connector contacts configured to be electrically connected to the host circuit board;

a plug module plugged into the front end of the receptacle cage and coupled to the front cage interface, the plug module including a plug housing having plug housing walls defining a plug module cavity, the plug module including a plug module circuit board held by the plug housing in the plug module cavity, the plug module circuit board having a mating edge; and a receptacle module plugged into the rear end of the receptacle cage and coupled to the rear cage interface for mating with the plug module plugged into the module channel of the receptacle cage, the receptacle module comprising:

a receptacle housing having receptacle housing walls defining a receptacle module cavity, the receptacle housing having a card slot configured to receive a plug module circuit board of the plug module, the receptacle housing walls including a bottom wall facing the host circuit board;

a receptacle contact assembly including receptacle contacts received in the receptacle module cavity of the receptacle housing, the receptacle contacts including cable contacts and intermediate contacts, each cable contact including a cable contact mating end and a cable contact terminating end, the cable contact mating end arranged in the card slot to interface with the plug module circuit board, each intermediate contact including an intermediate contact mating end and an intermediate contact terminating end, the intermediate contact mating end arranged in the card slot to interface with the plug module circuit board, the intermediate contact terminating end having a separable mating interface coupled to the corresponding intermediate connector contact of the intermediate connector; and cables terminated to the cable contact terminating ends and extending from the receptacle housing;

wherein the intermediate connector electrically connects the intermediate contacts with the host circuit board.

16. The communication system of claim 15, wherein the receptacle module is removable from the receptacle cage, the intermediate contacts being separated from the intermediate connector contacts when the receptacle module is removed from the receptacle cage.

17. The communication system of claim 15, wherein the intermediate contact terminating ends are provided at the bottom wall for mating with the intermediate connector contacts.

18. The communication system of claim 15, wherein the intermediate connector contacts include spring beams at a top of the intermediate connector, the spring beams being compressible when mated with the intermediate contacts, and wherein the intermediate connector contacts include one of spring beams or compliant beams at a bottom of the intermediate connector being electrically connected to board contacts of the host circuit board.

* * * * *